3 Sheets--Sheet 1.

J. A. BECHLER.
Childrens' Carriages.

No. 134,630. Patented Jan. 7, 1873.

Witnesses:
Albert L. Norris.
Wm J. Peyton

Inventor:
John A. Bechler,
By James L. Norris.
Atty.

J. A. BECHLER.
Childrens' Carriages.

No. 134,630. Patented Jan. 7, 1873.

Witnesses: Albert H. Norris. Wm J. Peyton.

Inventor: John A. Bechler. By James L. Norris. Atty.

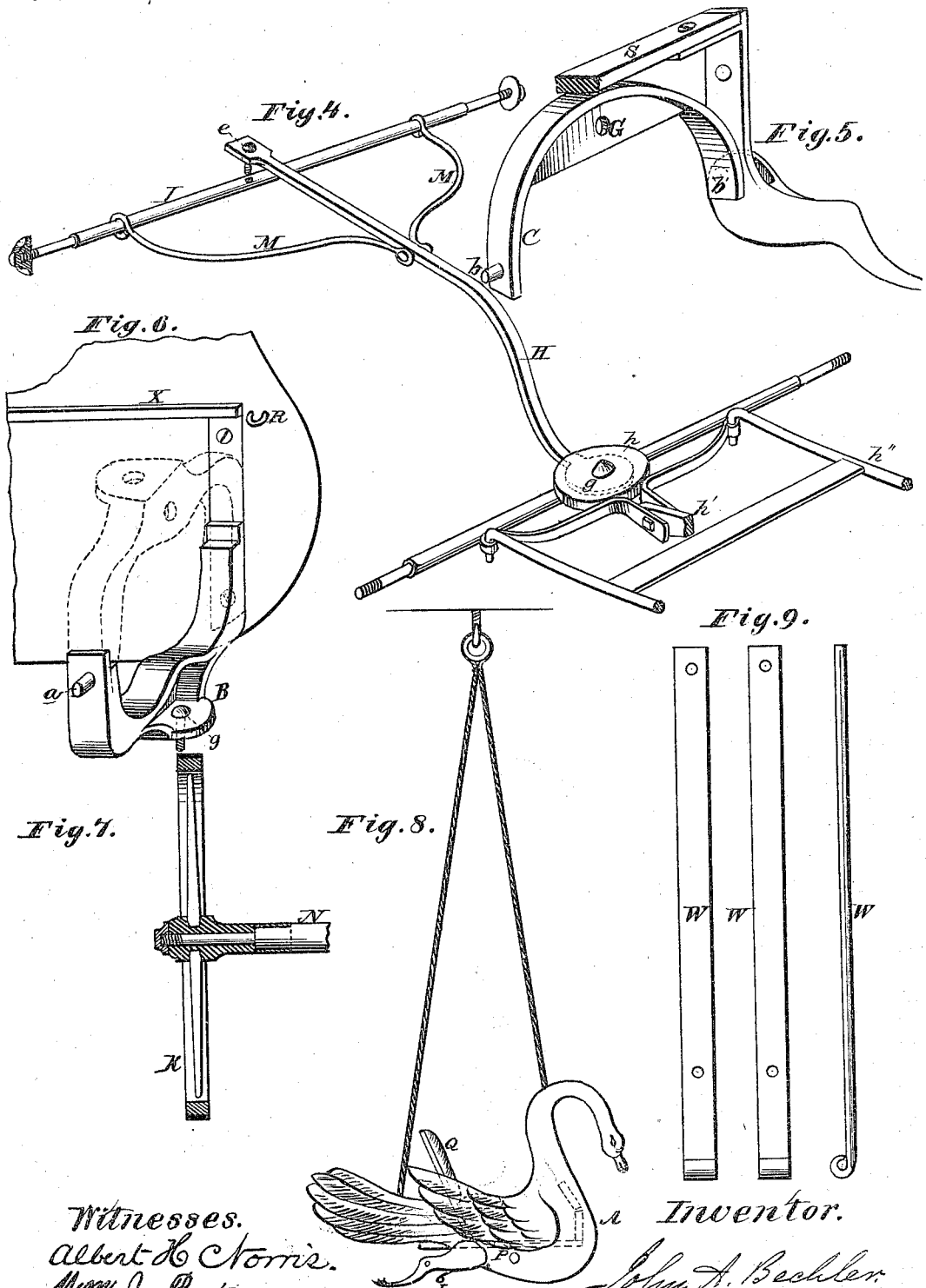

UNITED STATES PATENT OFFICE.

JOHN A. BECHLER, OF PHILADELPHIA, PENNSYLVANIA.

IMPROVEMENT IN CHILDREN'S CARRIAGES.

Specification forming part of Letters Patent No. 134,630, dated January 7, 1873.

*To all whom it may concern:*

Be it known that I, JOHN A. BECHLER, of Philadelphia, in the county of Philadelphia and State of Pennsylvania, have invented certain new and useful Improvements in Convertible Perambulator, Child's Carriage, Sleigh, &c., of which the following is a specification:

This invention has for its object to produce a vehicle the constituent parts of which are so constructed and arranged that either a four or two wheeled perambulator or child's carriage or a sleigh can be formed with ease and facility, thus combining in one single device the elements for the construction of a vehicle adapted for use at all seasons of the year, and, if desired, also for use as a swing.

The principal features of my invention consist in constructing the body of the carriage or vehicle of two lateral frames, representing in profile the figures of animals or birds, between which are located two transverse arc-shaped bars or bolsters, which are pivoted to the inner sides of the figures so as to be readily turned into a horizontal or vertical position for receiving and supporting a detachable board or floor, constituting in one of its positions the bottom of a perambulator or child's carriage, and in another position the platform of a child's sleigh. The invention further consists in constructing the bottom board or seat with jointed end sections which are capable of being elevated for forming the dash-board of either a perambulator, child's carriage, or sleigh, and of being folded parallel with and under the rigid section when applied to an ordinary child's sleigh. The invention also consists in mounting the rear axle of a four-wheeled perambulator or carriage in spring-bearings or in the legs of the profile frames, and bracing the same by diagonal braces extending from the reach, so as to permit the vertical play of the axle for counteracting the effects of jars when passing over irregular roads. The invention also consists in the provision of detachable runners, which, when the wheels are removed, are to be applied to the lateral figures for forming a child's sleigh. The invention also consists in the provision of a canopy which is applied to the vehicle body, and provided with movable curtains for affording shelter from the sun and rain.

Figure 1:
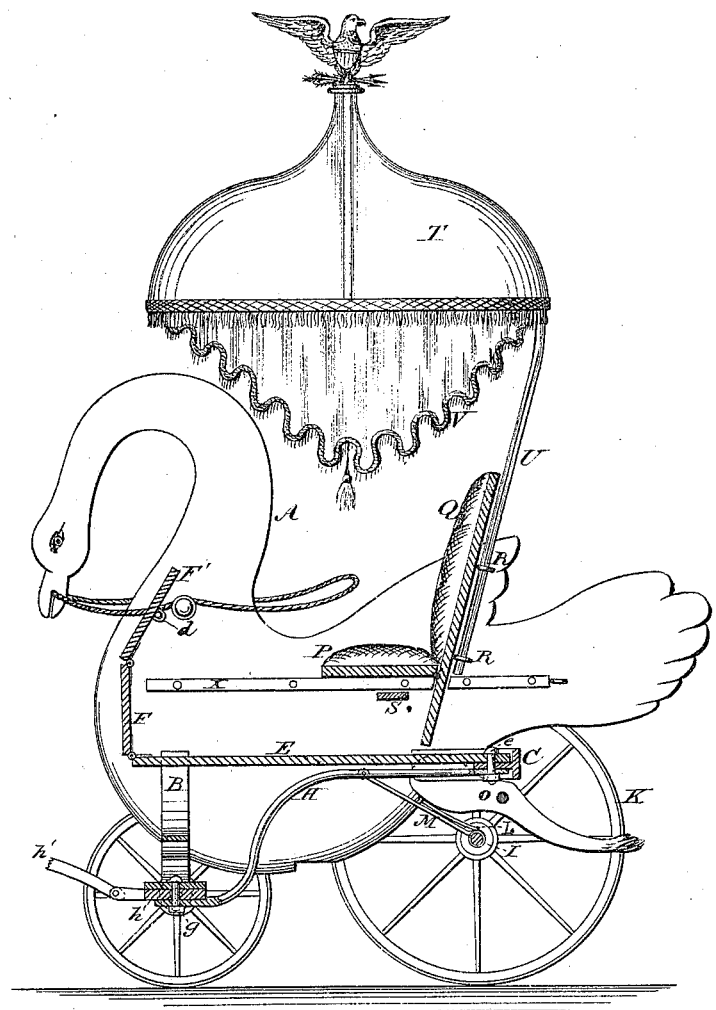
Figure 10:
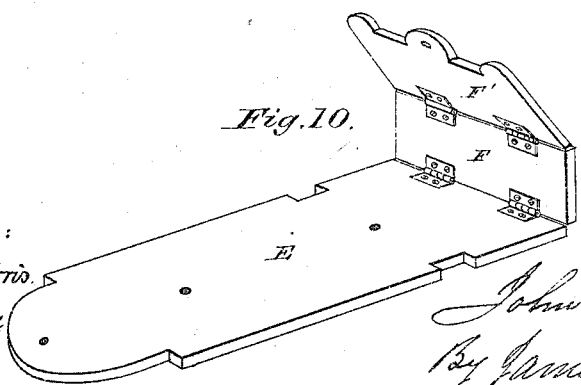
Figure 2:
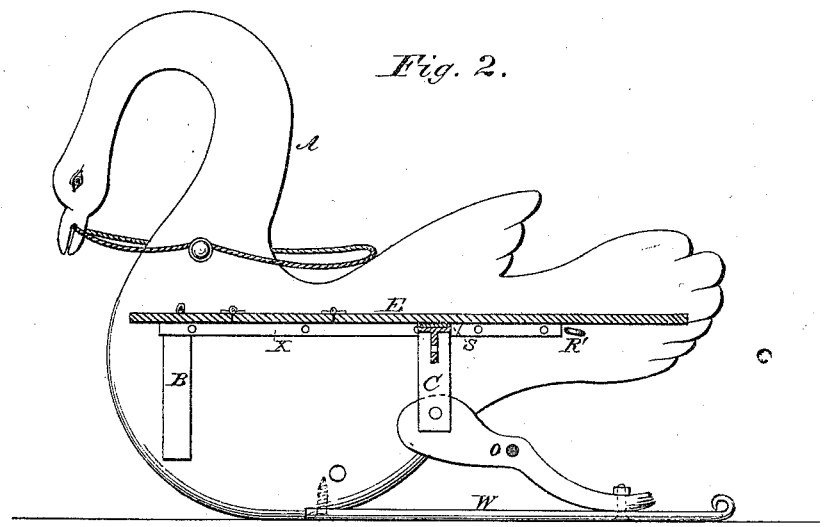
Figure 3:
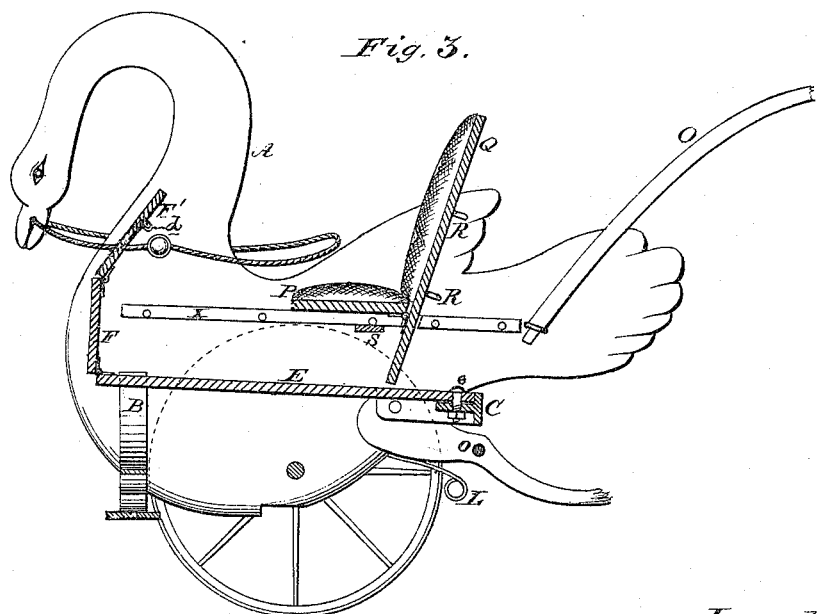

In the drawing, Figure 1 represents a vertical longitudinal section of a four-wheeled perambulator with the rear axle mounted in spring-bearings. Fig. 2 represents the vehicle converted into a sleigh. Fig. 3 illustrates a two-wheeled perambulator with centrally-located axle and wheels, without the canopy. Fig. 4 represents a detail view of the running-gear and draft-pole or shafts. Fig. 5 illustrates in detail the rear pivoted or oscillating supporting-bar. Fig. 6 represents a similar view of the front support. Fig. 7 is a detail view of the axle and wheel of a perambulator or child's carriage. Fig. 8 represents the child's carriage or perambulator converted into and adapted as a suspension swing. Fig. 9 represents the detachable runners. Fig. 10 is a perspective view of the bottom or platform with its hinged end sections.

The carriage-body is composed of two lateral and parallel boards or panels, A, which preferably represent in profile the figure or form of a bird or animal. These figures represent in the present instance a swan, and may be made of hollow or solid metal or wood, as is found most expedient for the purpose. At the forward end of the carriage, and between the figures composing the same, there is located a transverse bolster or curved bar, B, the ends of which are provided with short gudgeons $a$ inserted or journaled in the side panels A. These gudgeons form the pivot-point upon which the bar B is susceptible of being turned or oscillated for swinging it into the depressed positions represented in the various wheeled carriages or perambulators, and into the elevated position shown in Figs. 2 and 6. At the rear end of the body is arranged a curved or arc-shaped bar, C, which is provided with gudgeons $b$, subserving the same purpose as the front axis-pins $a$. The bottom of the carriage or sleigh is formed of a detachable board or platform, E, as clearly shown in Fig. 10, which possesses at its front end one, two, or more hinged or jointed sections, F F', for the purpose hereinafter stated. Said board or platform E preferably has its rear end rounded, as shown, for insertion into a correspondingly-shaped seat, G, formed in the rear oscillating bar or support C, the front end of the bottom being supported on ledges or shoulders on the bolster or bar B, and the hinged sections of the same turned into a vertical position for forming a dash-board, as shown in the various figures of the wheeled carriages.

For maintaining the dash-board in its adjusted position sliding bolts $d$, attached to the same and projecting into the sides of the body, are resorted to; or other fastening devices may be employed, if desired.

The rear end of the bottom or platform is shown in Fig. 1 as being secured in position by a vertical bolt, $e$, which passes through the bottom, its seat in the oscillating bar, and through the rear end of the reach H for securing the same in position. The rear axle I in the four-wheeled perambulator or carriage is also designed to have its journals in stationary bearings in the upper portion of the legs of the figures, as at $o$; and the axles and wheels may or may not revolve together. The reach H, connecting the rear axle and wheels with the front running-gear, is attached at the forward end, by the king-bolt $g$, to the circle-plate or fifth-wheel $h$, which possesses the usual form of axle and wheels K. The circle-plate has its bearing on the under side of the lateral extension of the oscillating support or bolster, and the king-bolt connecting the two parts together has its seat in the base of the chamber formed in the bolster, as shown in Fig. 6.

When it is desirable to impart to the carriage an easy movement for counteracting the effects of violent concussions on irregular roads, I journal the rear axles in spring-bearings L attached to the lower edges of the carriage-body, as shown in Fig. 1. The reach, in this instance, possesses curved or oblique brace-rods M, through which the axle passes, which may either be held in a stationary position by extending the bolt $e$ through the same, or the bolt may simply be passed through the bottom E, oscillating bar C, and rear end of reach, for permitting the simultaneous rotation of the axle and wheels. The draft is, in a four-wheeled carriage, applied either to a pole, $h^1$, or shafts $h^2$, as may be desired.

For forming a two-wheeled perambulator, as shown in Fig. 3, it is only necessary to remove the running-gear and to insert the axle of the pair of wheels into bearings located near the middle of the carriage-frames. The wheels and axle generally employed in a perambulator so constructed are shown in Fig. 7 as being provided with a sleeve, N, attached to the hub, or formed with the same so as to extend a sufficient distance on the axle for affording a lateral bearing-surface in contact with the side of the carriage-body. For moving such a perambulator as last described I provide push-handles O, which are detachably secured, by pintles and eyes, to the inner faces of the side frames of the carriage. The seat P, hinged or attached to a back-support, Q, is detachably secured in position by inserting the same in front of supporting lugs or eyes R on the inner sides of the carriage-frame, when the seat is caused to rest upon a transverse plate, S, attached to the sides of the body, which firmly maintains the seat in position. The eyes R or back-supports also constitute means for connecting an elevated canopy, T, which is formed of a suitable water-proof material, and provided with rods U inserted into said eyes R for securing the same in position while permitting its ready removal. The canopy is provided with a movable curtain, V, which affords a protection against the sun and rain. Said curtains are generally provided with cords running through a central eye in the canopy for raising and lowering the same. For converting the wheeled vehicle into a child's sleigh, as shown in Fig. 2, it is only necessary to detach the running-gear, and to apply instead, by bolts, a pair of runners, W, to the lower edges of the lateral figures and to the legs of the same, forming part of the carriage-frame. The front and rear oscillating bars or supports are now turned into a vertical position, as shown, forming transverse arches upon which the platform is supported. The platform of this sleigh is formed by the board E, which in the various carriages described serves as the bottom; and in order to make the same of the desired length the jointed end sections of the same are extended in line with the rigid section, and then, by placing the platform on longitudinal ledges or supports X on the sides of the frame and securing the same to the transverse supporting-plate and arched bar, the same is firmly maintained in position. This platform can be decreased in length by folding one or more of the hinged sections under the remaining sections, or one of the sections can be turned vertically in front for forming a support for the feet of the rider. The platform and back-support may, if desired, be retained in connection with the sleigh, as in Fig. 8. In Fig. 8 is shown another mode of applying the bottom, and dash-board, and the seat, the same being designed to form the whole, in such a manner as to prevent small children from falling out, whether the form be adapted and used with the axles in the springs, or rigid bearings arranged in the body or in the legs, or mounted on runners, to form a child's carriage, a perambulator, or a sleigh. In this said figure the body of the aforesaid form is shown with the axles, wheels, and runners removed, and the frames suspended by suitable ropes or chains connected near each corner, the design being that in case the invention is desired as a swing, the same can be readily converted into such, the only prerequisite being to remove the running-gear.

It is evident from the construction given the board E that forms either the bottom and dash of the perambulator, carriage, or swing, or the platform and dash for the sleigh, that by its application in connection with the panels or profile frames, and the movable bearings or bolsters, I am enabled to construct and impart to the vehicle various forms of boxes or inside surface; and, further, instead of the top being a canopy, the same can be made of any of the usual forms, and connected with the side frames in any suitable manner.

I do not confine myself to the precise details of construction above described, as the same may be varied without departing from my invention, as in certain instances the ornamental configuration of the carriage-frames herein shown may be dispensed with, and other features correspondingly changed or modified in form, and yet be within the scope of this invention.

Having thus described my invention, what I claim, and desire to secure by Letters Patent, is—

1. A vehicle, as described, convertible into a two or four wheeled child's carriage, or a perambulator, or a sleigh, substantially as herein set forth.

2. The oscillating or pivoted bars B C arranged between the parallel frames, and capable of being turned from a vertical to a horizontal position for supporting the bottom of a wheeled vehicle, or the platform of a sleigh, substantially as herein shown and described.

3. The detachable bottom-board E provided with one or more jointed sections for forming a dash-board for the child's carriage, or platform for the child's sleigh, as shown and described.

4. In a four-wheeled perambulator or carriage, substantially as described, mounting the rear axle of the wheels in the legs at o, or in spring-bearings, as at L, and combining therewith the removable brace-rods M M and reach H, as set forth.

5. In a child's carriage or perambulator, as described, the detachable canopy T provided with curtains V and rods U, in combination with the side frames A, the seat P, and bottom-board E, as and for the purpose set forth.

In testimony that I claim the foregoing I have hereunto set my hand this 23d day of December, 1872.

JOHN A. BECHLER.

Witnesses;
 ALBERT H. NORRIS,
 JAMES L. NORRIS.